United States Patent [19]
Dornberger

[11] 3,860,866

[45] Jan. 14, 1975

[54] METHODS AND APPARATUS FOR LOCATING AN OPEN SECTION IN A CONDUCTOR

[75] Inventor: George Christian Ernst Dornberger, Phoenix, Ariz.

[73] Assignee: Western Electric Company, Incorporated, New York, N.Y.

[22] Filed: May 4, 1973

[21] Appl. No.: 357,129

[52] U.S. Cl. ................................................. 324/52
[51] Int. Cl. ........................................... G01r 31/08
[58] Field of Search .......................... 324/52, 54, 51

[56] References Cited
UNITED STATES PATENTS

| 2,425,554 | 8/1947 | Nelson et al. | 324/52 |
| 2,586,781 | 2/1952 | Brownlow | 324/52 |
| 2,731,598 | 1/1956 | Herbert | 324/52 |
| 3,289,076 | 11/1966 | Edis et al. | 324/52 X |
| 3,628,133 | 12/1971 | Dornberger | 324/52 |

FOREIGN PATENTS OR APPLICATIONS

| 557,088 | 11/1943 | Great Britain | 324/52 |

*Primary Examiner*—Gerard R. Strecker
*Attorney, Agent, or Firm*—J. B. Hoofnagle, Jr.

[57] ABSTRACT

An oscillator is connected across the primary winding of a transformer having a potentiometer connected across the secondary winding thereof. A movable contactor on the potentiometer is connected to ground or a floating common terminal and is connected to a continuous conductor of a twisted pair of insulated elongated conductors or wires, the other of which contains a known open conductor section. The twisted conductor pair is one of a plurality of conductor pairs which have been formed into a cable. The opposite ends of the open conductor are connected across the secondary winding of the transformer, which supplies signals 180° out of phase relative to one another to the opposite sides of the open wire. The remaining conductors of the cable are connected at both ends to the common terminal through a high impedance voltmeter. The contactor on the potentiometer is adjusted to achieve a minimum reading on the meter to balance out the capacitive loading of the cable on the open wire. Thereafter, the meter is shunted to connect the remaining conductors of the cable directly to the common terminal. The cable is advanced longitudinally past a capacitive sensor or electrode coupled to a synchronous phase detector circuit to detect a phase shift when the open section of the conductor is advanced past the sensor. The phase detector is designed to respond to a detected phase shift regardless of the direction of advance of cable.

15 Claims, 10 Drawing Figures

PATENTED JAN 14 1975      3,860,866

METHODS AND APPARATUS FOR LOCATING AN OPEN SECTION IN A CONDUCTOR

BACKGROUND OF THE INVENTION

1. Field of the Invention

The present invention relates to methods and apparatuses for locating open conductors and more particularly to a method of and apparatus for locating an open section of a filamentary conductor and even more particularly to a method of and apparatus for locating an open section in one of a plurality of insulated elongated conductors which have been formed into a cable.

2. Technical Considerations and Prior Art

In the manufacture of cable utilized for communications purposes, pairs of insulated elongated conductors or wires are twisted together and the twisted wire pairs are stranded together in one or more operations to form an elongated cable core. Thereafter, the cable cores may be jacketed with an insulating layer of plastic material extruded therearound or may be sheathed with one or more protective metallic shields with an intermediate jacket therebetween and an outer jacket therearound.

After stranding and on some cables, after jacketing, the cable is usually tested to assure the continuity of the conductors therein before any subsequent processing. This is done so that any open conductors may be located and repaired before the sheathing and/or jacketing operations are performed since repair thereafter involves stripping the cable and scrapping the stripped material.

Most continuity tests performed on cables merely disclose which of the wires making up the cable are open. The number of opens in any given wire are usually unknown. Some types of fault locating apparatus provide an indication, based on the capacitance of the wire, proportional to the distance of the first open section of wire from the end of the cable. These indications are, however, in most cases, unreliable in locating the precise section of the cable corresponding to the open in the wire.

Other methods of locating the site of an open section in a wire in a unit or cable configuration are time consuming and relatively difficult. Commonly, an audio oscillator is connected across the open conductor pair, and the tone is detected along the cable. The amplitude of the oscillator may be adjusted to permit the tone to be sensed or picked up by means of a capacitively coupled electrode or probe. When the tone disappears as the cable is advanced past the probe, that is an indication that the open has passed through the probe.

This method is sufficient if the open section of the wire occurs in an outside layer of the cable core. However, if the open conductor is one which is inside the core near the center, the capacitance between the wire containing the open section and the remaining wires in the cable causes the oscillator signal to be attenuated such that it cannot be detected or produces a false tone along a substantial longitudinal section of the cable, among other things. In the latter case, the probe will not detect the disappearance of the tone until the probe is positioned a considerable distance from the actual open wire section.

Thus, where it is desired to locate an open section of a conductor in a cable core or a finished cable, an operator must open the core to insert a needle-type probe to contact the conductive portion of the insulated wire containing the open section and listen for the tone. This can be done with units onto which no outer jacket has been formed. However, in certain types of cable, the units are jacketed before any testing is done thereon, with an outer plastic jacket formed directly around the core to produce a finished cable.

If the plastic jacket on such a cable has to be cut open in order to commence locating an open conductor by the insertion of a probe, the opened portion of the cable can be used no longer and must be cut from the open wire section to the signal input end and scrapped. Moreover, since a needle electrode or pick is used with which the wire insulation can be penetrated to make contact directly with the metal conductor, this procedure is repeated at a predetermined distance along the core until the open section of conductor is passed. By going back and forth, the operator can eventually find the open conductor and repair it. This process is electrically tolerable with wire insulated with paper pulp. However, if the wire is insulated with plastic material, pinholes are produced in the insulation which can cause high voltage failures.

There is a need, therefore, for a method of and apparatus for locating open sections in the conductors of a unit or cable core comprising a plurality of insulated conductors wherein opens on the inside of the unit may be detected as easily as opens on the outside thereof, preferably automatically and without relying upon the judgment and skill of an operator. Such a method and apparatus would thus be more reliable than present methods and apparatuses and would considerably lessen the time required to locate an open conductor in a cable with less chance of damaging the cable and with a substantial reduction in the cable which must be scrapped.

SUMMARY OF THE INVENTION

It is an object of the present invention to provide a new and improved method of and apparatus for locating an open section in an insulated elongated conductor.

It is a further object of the present invention to provide a new and improved method of and apparatus for locating an open section in an insulated elongated conductor which is one of a plurality of similar insulated elongated conductors formed into an elongated cable core.

It is a further object of the present invention to provide a new and improved method of and apparatus for locating an open section of an insulated elongated conductor forming part of an elongated cable core utilizing a capacitive coupling between a sensor and the cable core wherein the capacitance between the open conductor and the remaining conductors does not produce any false indications of the position of the open section of the open conductor.

A method of locating an open section of an elongated insulated conductor, in accordance with the principles of the present invention, may include, simultaneously applying first and second periodic phase-shifted electrical signals to the elongated conductor on opposite sides of the open section and detecting a phase shift along the elongated conductor to locate the open section thereof.

An apparatus for locating an open section of an elongated insulated conductor, in accordance with the principles of the present invention, may include means for applying a periodic electrical signal to the elongated conductor on one side of the open section thereof, means for simultaneously applying a second periodic electrical signal, shifted in phase relative to the first signal, to the elongated conductor on the other side of the open section thereof and means for detecting a phase shift along the elongated conductor to locate the open section thereof.

BRIEF DESCRIPTION OF THE DRAWINGS

A more comprehensive understanding of the invention may be obtained from a detailed description of a specific embodiment thereof, when read in conjunction with the accompanying drawings, wherein.

DETAILED DESCRIPTION

Figure 1:
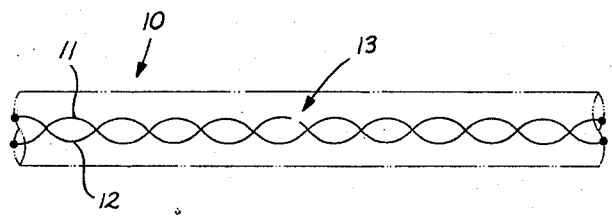
FIG. 1 is a schematic illustration of a communications cable which includes a plurality of twisted pairs of insulated elongated conductors which have been stranded together into cable form and containing at least one conductor of a twisted pair therein having an open section.
Figure 2:
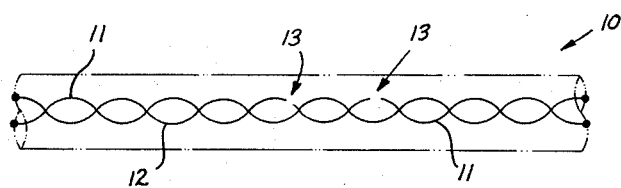
FIG. 2 shows the cable of FIG. 1 wherein one conductor of a twisted pair therein contains two open sections.

Referring to FIG. 1, there is generally indicated at 10, a cable including an open twisted pair of insulated elongated conductors 11 and 12, the conductor 11 thereof containing an open section indicated at 13. The cable 10 may contain many twisted wire pairs which are not shown for simplicity. It is desired to locate the open section 13 of the conductor 11 in order to repair the open section to provide an acceptable cable. Additionally, the conductor 11 may contain two open sections 13 as shown in FIG. 2.

Figure 3:
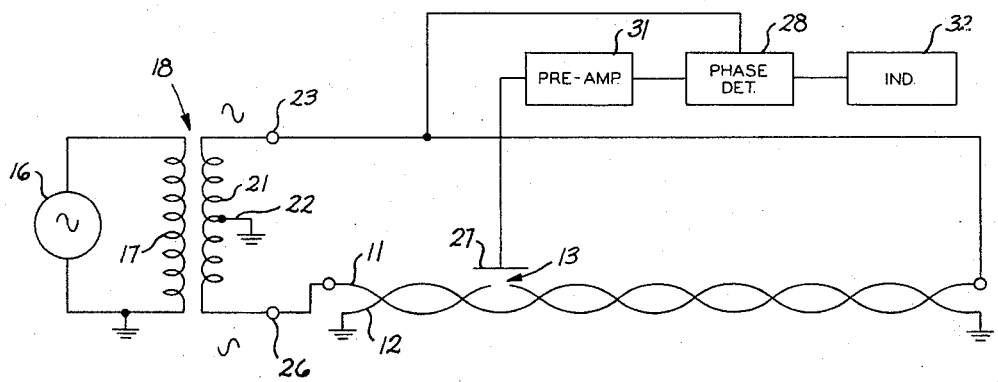
FIG. 3 is an electrical schematic diagram, partly in block form, of a circuit arrangement for locating an open section in one of a twisted pair of insulated conductors or wires in accordance with the principles of the present invention.

FIG. 3 shows an arrangement for locating the open section 13 of the conductor 11 when the twisted pair 11–12 is not part of a cable or when the twisted pair 11–12 is in an outer layer of the cable core. An oscillator 16 is connected across the primary winding 17 of a transformer 18 having a secondary winding 21. The secondary winding 21 of the transformer 18 is provided with a grounded center tap 22 and the primary winding 17 is grounded. With this arrangement, if capacitive loading is neglected, signals of equal amplitude at the oscillator frequency and phase shifted by 180° appear at a pair of output terminals 23 and 26 of the transformer secondary winding 21. The opposite ends of the conductor 11 are connected to the terminals 23 and 26 of the transformer secondary winding 21. It is now possible to detect the open section 13 of the conductor 11 by providing relative movement of the twisted conductors 11 and 12 longitudinally with respect to a capacitive probe or sensor 27, which may be connected to a phase detection circuit 28 through a preamplifier circuit 31. The output of the phase detector 28 may be provided with an indicating means 32, for example, a meter or a lamp, which would indicate the occurrence of the detected 180° phase shift when the open section 13 of the conductor 11 is adjacent to the probe 27.

For purposes which will be apparent later, it is desirable, rather than to provide a center tap 22 at the secondary winding 21 of the transformer 18, to obtain a similar result if a potentiometer 36 (FIG. 4), which includes a resistance 37 and a moveable contactor 38, is connected such that the resistance 37 appears across the ungrounded secondary winding 21 of the transformer 18 and the moveable contactor is connected to ground. Throughout this specification, the term "ground" shall mean a common defined electrical reference point at a predetermined potential which may not necessarily be earth ground or zero volts, although the latter is preferable for convenience.

Figure 4:
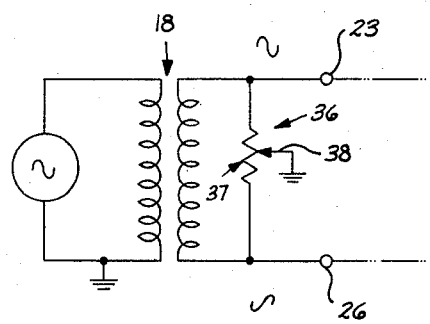
FIG. 4 is an alternative arrangement of part of the circuit of FIG. 3.

The potentiometer arrangement of FIG. 4 may be used in place of the grounded center tap 22 of FIG. 3 to provide a 180° signal phase shift at the open section 13 of the conductor 11. The arrangements of FIGS. 3 and 4 work well for locating an open section of a conductor which is one of a twisted pair of conductors which are one of only a few twisted conductor pairs in a cable or are in an outer layer of the core. It will also be appreciated that, as shown in FIG. 2, the conductor 11 may contain more than one open section. As will be seen from the description of the phase detector 28 in connection with FIG. 8, the arrangement will detect not merely a shift in phase, but a disappearance and reappearance of a signal at first and second spaced open sections, respectively, in a single conductor. Thus the circuit arrangement of FIG. 3 may be used to detect one or two open sections or breaks in a single conductor of a twisted pair within the limitations set forth, namely, if the twisted pair is alone, is part of a cable containing relatively few pairs, or is in an outer layer of a larger-type cable.

In larger cables, containing 25 or more pairs of twisted elongated conductors, the circuit of FIG. 3 is inadequate to detect the precise location of an open section in one of the conductors unless the open conductor is in one of the outer layers of the cable core. If the open conductor is, for example, at or near the radial center of the core, the capacitance of the open conductor to the remainder of the core must be taken into account, since the capacitive loading of the core can advance or delay the detection of the open section of the conductor when it is at a considerable distance from the probe 27 and not adjacent thereto. Thus, the indication on the indicator 32 would give a signal indicating an apparent open which may be, for example, 25 feet on either side of the real open section 13 of the conductor 11. Thus, the capacitive loading of the remaining conductors of the cable 10 on the conductor 11 under test can render such an indication of little value.

Figure 5:
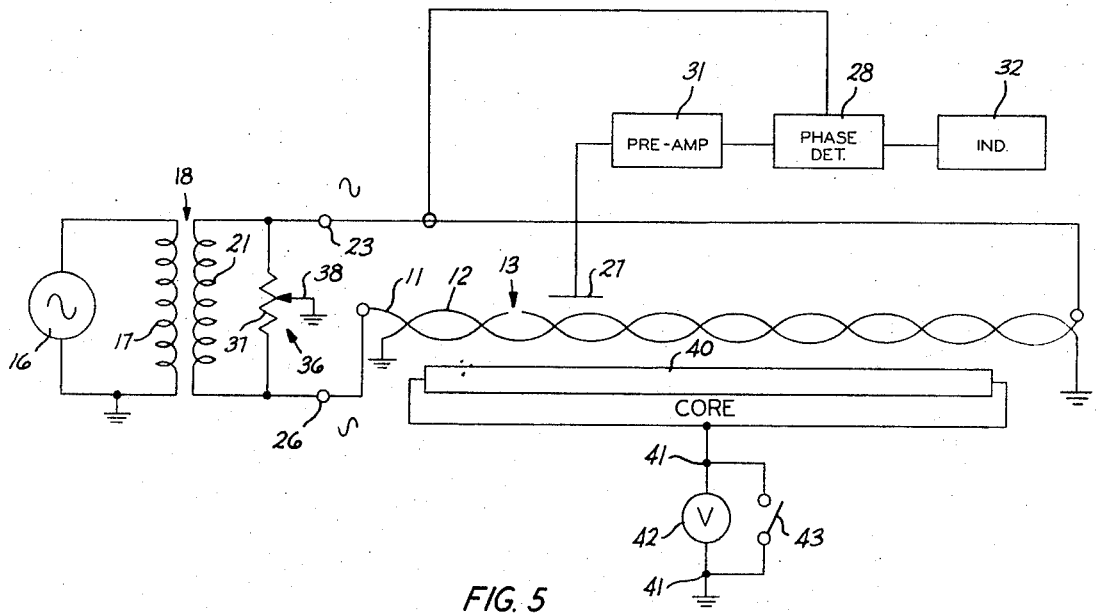
FIG. 5 is an electrical schematic diagram of a circuit arrangement for locating an open conductor in a cable, in accordance with the principles of the present invention and including means for balancing out or neutralizing the capacitive effect between the open conductor and the remainder of the conductors in the cable in order to locate the open conductor section utilizing a capacitive probe.

A method of compensating, balancing out or neutralizing the effect of the capacitive loading of a cable core on an open conductor 11 contained therein, is illustrated in FIG. 5. The circuit arrangement of FIG. 5 is similar to the arrangement of FIG. 3 with the remaining conductors of the core, indicated at 40, being connected together at both ends and connected to one of two terminals 41—41 of an A.C. voltmeter 42 having its other terminal connected to ground.

If the moveable contactor 38 of the potentiometer 36 is adjusted until the voltage to ground induced in the core 40 is at a minimum, the capacitive effects of the core 41 will be balanced and the open section 13 of the conductor 11 may be detected by the probe 27 and detector circuit 28 when the open section 13 of the conductor 11 is precisely adjacent to the probe 27. After the minimum is achieved on the meter 42, a shunting switch 43, connected across the meter terminals 41—41, may be closed to connect the ends of the core 40 directly to ground. Alternatively, the meter 32 may be removed and the core 40 connected directly to ground.

Figure 6:
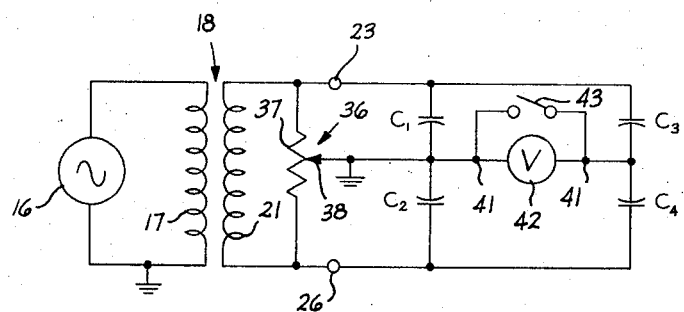
FIG. 6 is an electrical schematic diagram of the equivalent circuit of part of FIG. 5.

A clear understanding of the balancing of the circuit of FIG. 5 is shown in the equivalent circuit of FIG. 6 wherein capacitances C1 and C2 represent the capacitances to ground of the conductor 11 on either side of the open section 13. Similarly, the capacitances C3 and C4 represent the capacitances to ground of the core 40 with respect to either side of the open conductor 11. It can be seen that the effect of moving the contactor 38 of the potentiometer 36 essentially balances a capacitance bridge comprising the capacitances C1, C2, C3 and C4. The balancing is accomplished by shifting the ground or circuit reference in the bridge configuration. At minimum potential on the meter 32, the bridge arms are equal, that is, the impedance of the combination of C1 and C3 is equal to the impedance of the combination of C2 and C4. By utilizing a high impedance meter, the core 40 is held above ground for the measurement, thus allowing higher voltage levels to be induced therein.

Once the balancing has been achieved, the core 40 is grounded to minimize noise in the system to avoid spurious signals. Although a potentiometer has been shown connected across the output of the transformer secondary, a precision resistance voltage divider network can be used and the approximate distance from the first open section 13 of the conductor 11 from the input end of the cable 10 could be determined by the ratio of the amount that the voltage divider is off center or unbalanced to the total resistance. It will be appreciated that after balancing, the voltage appearing at the terminal 23 will differ in value from the voltage appearing at the terminal 26, that is, the peak amplitudes and the r.m.s. values of the sinusoidal voltages will differ. However, the signal appearing at the terminals 23 and 26 will always be 180° out of phase and can be detected at the phase detector 28.

The oscillator 16 is preferably an audio oscillator stabilized at a frequency of 1 khz. and has an amplitude which can be adjusted from 10 to 100 volts r.m.s. For the larger cable sizes, for example, a cable having a diameter of 3.5 inches, it is desirable to use an oscillator having an amplitude of 100 volts. Additionally, the transformer 18 is preferably an audio transformer provided with double shielding. Similarly, the probe 27 should be shielded and the shield connected to ground. Though it is preferable to ground the core 40 during the detection operation, the arrangement of FIG. 5 will permit the phase shift at the open to be detected without grounding the core 40. However, it is recommended that the core 40 be grounded, as mentioned above, to minimize noise.

The capacitve electrode 27 is preferably a cylindrical-type probe having an inside diameter large enough to pass the largest diameter of cable desired to be tested. The electrode length should be large enough, consistent with the speed of advance of the cable 10, to produce an output signal when an open section of wire passes therethrough. At a speed of 100 feet per second, the electrode length is preferably about one foot. The electrode additionally should be provided with hinges or should be otherwise separable in order to permit lateral insertion and removal of the cable 10 rather than passing the end of the cable therethrough. Alternatively, the electrode 27 may be of a parabolic cross section with the cable center passing axially through the focus of the parabola.

The cable 10 may be advanced past the probe 27 by any suitable rewinding apparatus having reversibly driven supply and take-up reels, and may be similar to the rewinding apparatus disclosed in U.S. Pat. No. 3,628,133, issued Dec. 14, 1971, in the name of G. C. E. Dornberger. The electrical connections to the cable 10 may be made through the reels using sliprings, conductive liquids or any suitable connecting means.

Figure 7:
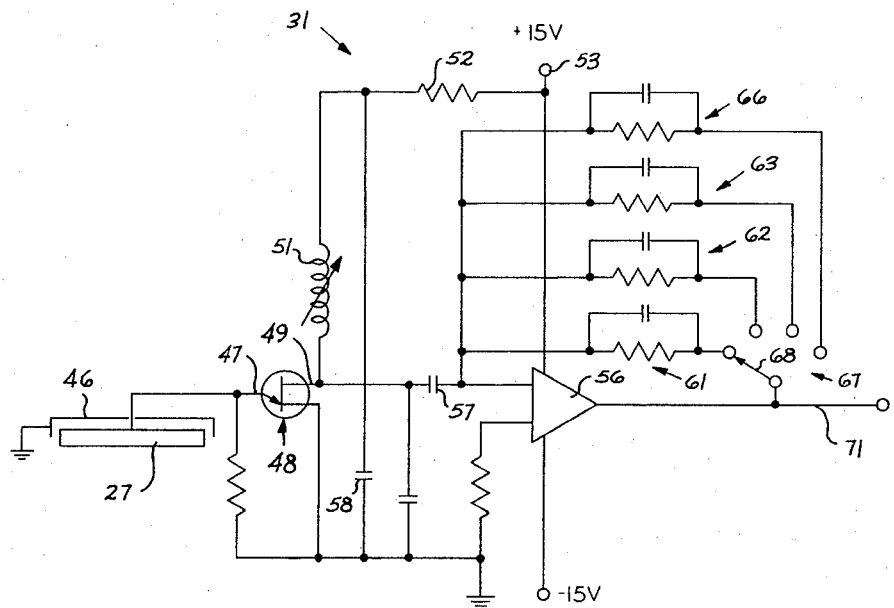
FIG. 7 is an electrical schematic diagram of a preamplifier circuit for a capacitive probe for sensing the open conductor section in the arrangements of FIGS. 3, 4 and 5.

The preamplifier circuit 31 is shown in FIG. 7. Referring to FIG. 7, the probe 27 is provided with a shield 46 therearound, which is grounded. The electrode 27 is connected to the preamplifier circuit 31 at the gate 47 of a field effect transistor (FET) 48, having a variable inductance 51 connected between the collector 49 of the FET 48 and a biasing resistor 52 coupled to a bias supply terminal 53 for the circuit 31. The output of the FET 48 is coupled to an integrated circuit-type operational amplifier 56 through a coupling capacitor 57.

The inductance 51 and a capacitance 58 connected thereacross and across the FET 48 provide a tunable circuit for the preamplifier 31, which is tuned by adjusting the inductance 51 to the frequency of the oscillator 16, namely, 1 khz. The amplifier 56 is provided with four feedback circuits 61, 62, 63 and 66, one of which may be selected through a selector or range switch 67 to connect one of the circuits 61, 62, 63 or 66 between the input and the output of the amplifier 56. Each circuit 61, 62, 63 and 66 includes a resistor and capacitor in parallel having values chosen to provide stabilized amplification ranging from an amplification of from 1 to 1,000 by the selective positioning of a moveable contact 68 of the switch 67. The highest amplification would be set for those open conductors nearest to the center of the cable core.

The tuned preamplifier 31 preferably has a "Q" value of approximately 50 and should not introduce more than 10° of phase shift between the input and the output thereof in any position of the switch 67. Since the amplifier 56 is of the operational type, it has a low output impedance which permits the output signal of the electrode 27 to be amplified and transmitted at a high signal-to-noise ratio to allow for any severe noise conditions in the circuit.

The preamplifier circuit 31 is preferably located as closely as physically possible to the electrode 27. It is preferred that the preamplifier 31 be mounted on the shielded enclosure 46 for the electrode 27. The output of the preamplifier 31, which appears at a terminal 71, is coupled to an input terminal 72 of the synchronous phase detector circuit 28, illustrated in FIG. 8. A synchronous phase detector is preferable because of its inherent ability to reject noise. It will be appreciated, however, that other phase detectors might be used.

Figure 8:
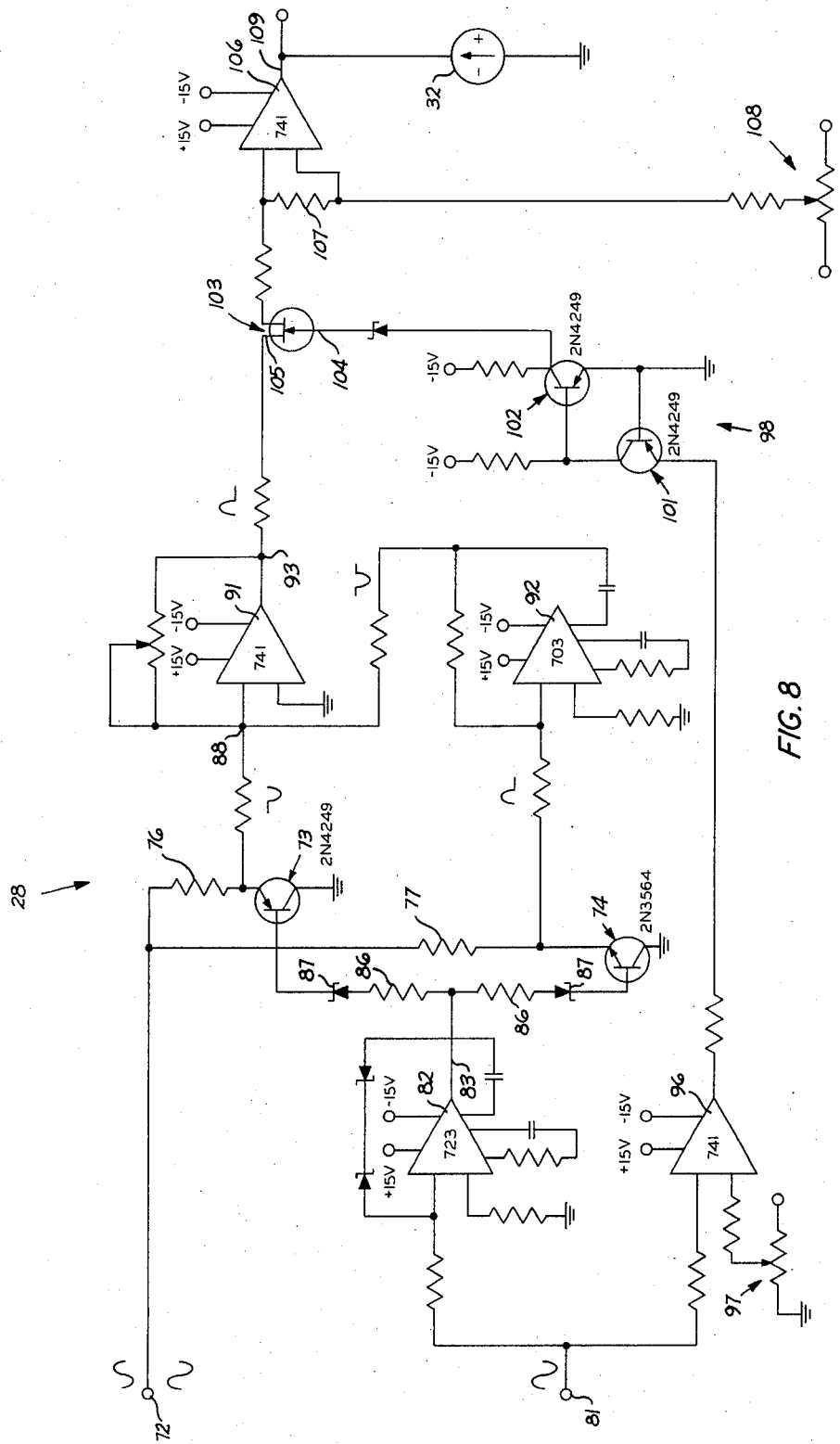
FIG. 8 is an electrical schematic diagram of a synchronous phase detection and indication circuit illustrated in block form in FIGS. 3 and 5 coupled to the output of the preamplifier circuit of FIGS. 1 and 7, for detecting and indicating an open conductor as it is advanced past the capacitive probe.

The phase detector circuit 28 compares the signal from the preamplifier circuit 31 to a reference signal at the oscillator frequency and provides an indication on the indicator 32, which may be a meter, as shown in FIG. 8, of a change in phase between the input signal and the reference signal.

The phase detector 28 includes first and second transistor switches to ground 73 and 74, each having its emitter coupled to the input terminal 72 of the phase detector 28 through first and second equal resistances 76 and 77, respectively. A common base drive for the transistors 73 and 74 is related in phase with the incoming signal on the input 72 such that either the positive half wave or the negative half wave of the incoming signal is shorted to ground. The two transistor switches and their associated circuitry are utilized to obtain full wave synchronous rectification of the incoming signal. The transistors 73 and 74 are complementary, being of opposite conductivity types. The switching square wave providing the base drive for the transistor switches 73 and 74 is derived from the signal at the terminal 23 or the terminal 26 of the transformer 18.

Figure 9:
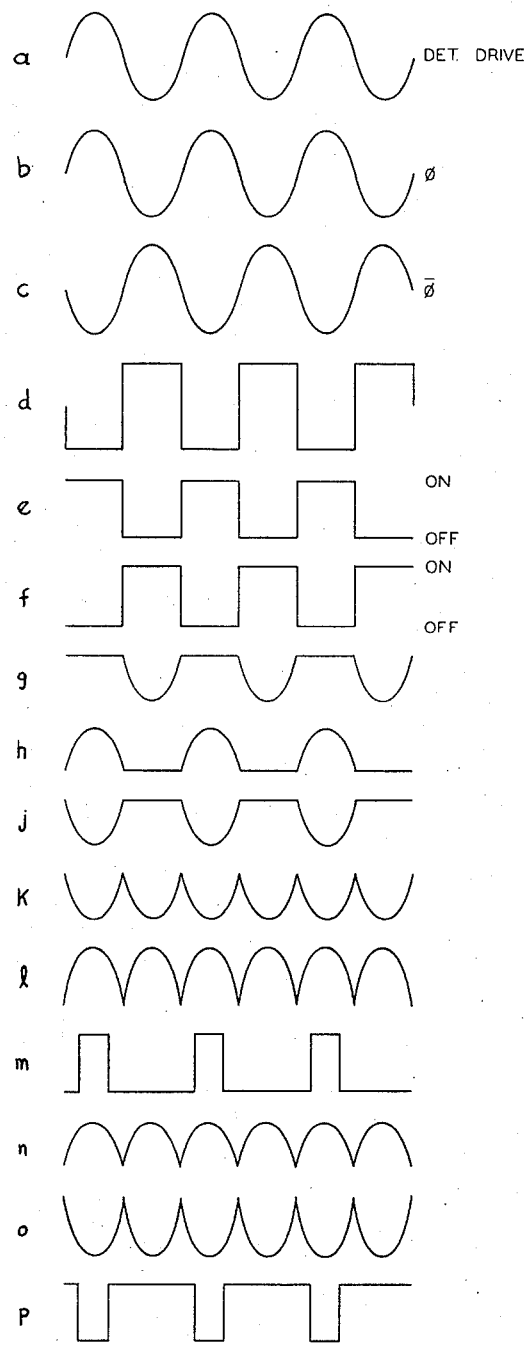
FIG. 9 illustrates various wave forms appearing in the synchronous phase detector of FIG. 8 when utilized in conjunction with the circuit arrangements of FIGS. 3 and 5.

The various wave forms in the detector circuit 28 are shown in FIG. 9. The driving signal at a terminal 81 of the circuit 28 is coupled to the inverting input of a feedback amplifier 82, which is an integrated circuit-type operational amplifier of a commercially available type. The feedback components of the amplifier 82 are selected such that the signal sinusoidal drive signal at the input thereof (FIG. 9a) is inverted and converted to a square wave (FIG. 9d) at an output 83 thereof. The square wave output of the amplifier 82 is synchronized with the driving signal from the transformer 18 and shifted in phase 180° with respect thereto.

The output of the amplifier 82 drives one of the transistor switches 73 or 74 into conduction during each half-cycle of the square wave. The output 83 of the amplifier 82 is connected to the base of each transistor 73 and 74 through a resistor 86 and a Zener diode 87. During negative half-cycles of the square wave, the transistor 73 is rendered conductive (FIG. 9e), while during positive half-cycles of the square wave, the transistor 74 is conductive (FIG. 9f).

The input signal at the terminal 72 of the circuit 28 may be in phase (FIG. 9b) or 180° out of phase (FIG. 9c) with the reference or driving signal at the terminal 81 thereof, depending upon which terminal 23 or 26 of the transformer 18 is selected as the reference and upon which side of the open section 13 of the conductor 11 is being advanced past the capacitive probe 27. If the transformer terminal 23 is used as the driving signal for the circuit 28 and the cable 10 is being advanced from left to right past the probe 27, with reference to FIGS. 3 and 5, the signal appearing at the input terminal 72 will be in phase with the signal appearing at the reference terminal 81 of the circuit 28 (FIGS. 9b and 9a, respectively).

Since the transistor 73 is conductive for only the negative half-cycle of the switching square wave appearing at the base thereof, the positive half-cycle of the in-phase input signal is synchronously grounded when the transistor 73 is switched on. The negative half-cycle of the input signal, however, since it coincides with the positive half-cycle of the square wave, is not suppressed and appears at a summing junction 88 at the inverting input of an integrated circuit-type operational amplifier 91 (FIG. 9g).

Because the transistors 73 and 74 are complementary, the transistor 74 passes the positive half-cycle of the input signal (FIG. 9h). The signal thus appearing at the emitter of the transistor 74 is inverted (FIG. 9j) by an inverting operational amplifier 92 and fed to the summing junction 88.

The signals appearing at the summing junction 88 (FIGS. 9g and j) are added (FIG. 9k), amplified and inverted by the amplifier 91 and appear as in FIG. 9l on an output 93 thereof, which is a full wave rectified version of the in-phase signal appearing at the terminal 72 synchronized at the oscillator frequency.

The terminal 81 is further coupled to an inverting input of an integrated circuit-type operational amplifier 96 connected without feedback elements. The amplifier 96 is adjusted by a voltage divider network 97 coupled to its non-inverting input to amplify and invert approximately thirty degrees of each positive half-cycle of the driving wave form. The output of the amplifier 96 is coupled to a trigger circuit 98, including first and second transistors 101 and 102, connected in a cascade configuration, which shapes and inverts the output of the amplifier 96 to trigger an FET 103 at gate 104 thereof. The trigger pulses for the FET 103 are shown in FIG. 9m.

When the FET 103 is triggered it conducts, coupling the positive-going signals at the output 93 of the amplifier 91 appearing at the collector 105 of the FET 103 to an amplifier 106, having its inverting and non-inverting inputs connected together through a resistor 107. The amplifier 106 is adjusted, through an adjustable voltage divider network 108 coupled to the non-inverting input thereof, to drive an output 109 thereof positive when positive-going signals are passed by the FET 103 and to drive the output 109 negative when negative-going signals are passed by the FET 103. When no signals are passed by the FET 103, the output 109 of the amplifier 106 is adjusted to zero. These signals may be visually observed on the meter 32.

Thus, during the occurrence of an in-phase signal at the terminal 72 of the detector 28 the meter 32 provides a positive reading. When an open section of a conductor 11 having a single open 13, as shown in FIGS. 3 and 5, is advanced past the probe 27, the meter 32 will display a positive quantity, indicating the presence of an in-phase signal detected from the portion of the conductor 11 leading the open section 13 thereof. When the open conductor section 13 is adjacent to the probe 27, the out-of-phase signal from the side of the conductor 11 following the open section 13 thereof is detected by the probe 27 and appears preamplified at the terminal 72 of the detector 28.

The out-of-phase signal (FIG. 9c) at the terminal 72 of the phase detector 28 is switched through the transistor switches 73 and 74 in a manner similar to the manner in which the in-phase signal (FIG. 9a) is switched therethrough, but lagging in phase by 180°. The transistor 73 passes the positive half-cycles of the input signal (FIG. 9h + 180°) while supressing the negative half-cycles thereof, while the transistor 74 passes the negative half-cycles of the input signal (FIG. 9g + 180°) and supresses the positive half-cycles thereof.

The negative half-cycles of the input signal passed by the transistor 74 are inverted at the amplifier 92, producing positive-going pulses at the summing junction 88 of the amplifier 91 alternatively with the positive-going pulses passed by the transistor 73. The full wave rectified signals at the summing jucntion 88 of the amplifier 91 (FIG. 9n) are inverted and amplified and appear as a series of full wave rectified negative-going signals at the collector 105 of the FET 103 (FIG. 9o). At this time, the output of the FET 103 appears as a series of negative-going spaced pulses at the oscillator frequency (FIG. 9p) which drive the output 109 of the amplifier 106 negative and produce a negative needle deflection on the meter 32.

Thus, with a single open section 13 in a conductor 11, or double open sections adjacent to one another in both conductors 11 and 12, advanced past the probe 27 from left to right, with reference to FIGS. 3 and 5, the meter 32 is positively deflected until the open section 13 is adjacent to the probe 27 and is thereafter deflected in a negative direction going through zero to indicate that a phase shift has occurred and that the open section or sections 13 is at the probe 27.

The meter 32 may be replaced by an alarm circuit or the like, which may include a relay or other suitable switching device which may stop the advance of the rewinding apparatus whenever an open section of the conductor is indicated by a change in polarity of the output 109 of the amplifier 106.

If the cable 10 were advanced from right to left past the probe 27 with reference to FIGS. 3 and 5, the out-of-phase signal would appear at the terminal 72 of the phase detector intitially and would shift to an in-phase signal when the open section of the conductor is adjacent to the probe 27. Thus the output 109 of the amplifier 106 would initially have a negative polarity which would shift positive when the open section of the conductor is adjacent to the probe 27.

Thus the synchronous phase detector circuit 28 produces a visually observable and utilizable output regardless of the direction of the advance of the cable 10.

Additionally, if the conductor 11 of interest contains two spaced open sections 13, as shown in FIG. 2, or if the conductor 11 between the sections 13 is wholly missing, the output 109 of the amplifier 106 would initially have either a positive or negative polarity, depending upon the direction of advance of the cable 10, until the first open section 13 or an intermediate end of the conductor 11 was advanced past the probe 27 at which time no signal would appear at the terminal 72 of the phase detector circuit 28. At this time, no signals are present to be switched by the transistor switches 73 and 74, and the positive-going or negative-going signals would no longer appear at the output 93 of the amplifier 91 so that no pulses are switched through the FET 103 and the output 109 of the amplifier 106 will change from its positive or negative polarity to zero. Similarly, the meter 32 will change from a positive or negative reading to zero.

The output 109 of the amplifier 106 will remain at zero until the second open section 13 of the conductor 11, or its continuation, in the case of a wholly missing conductor section, is advanced past the probe 27 at which time, depending upon the direction of advance of the cable 10, an out-of-phase or in-phase signal will appear at the terminal 72 of the phase detector circuit 28. The reappearance of a signal at the terminal 72 of the phase detector 28 will cause the output 109 of the amplifier 106 to change from zero to a negative or a positive polarity, indicating that the second open section has advanced past the probe 27.

In practice, it is desirable to stop the advance of the cable 10 whenever the output 109 of the amplifier 106, visually observed on the meter 32, changes in order that the cable core may be opened to repair the open section 13 of the conductor 11 before any further advancement of the cable 10.

Figure 10:
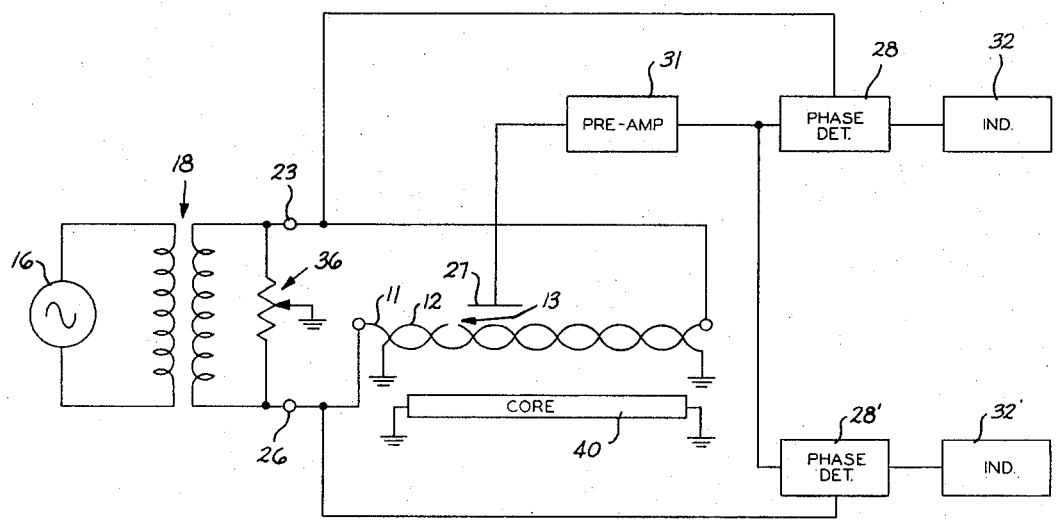
FIG. 10 is an electrical schematic diagram of an arrangement similar to FIG. 5, utilizing two phase detecting and indicating circuits.

If it is desired to utilize a phase detecting scheme which is based on an in-phase reading at all times, two phase detectors, similar to the phase detector 28 of FIG. 8, may be used as shown in FIG. 10.

Referring to FIG. 10, an additional phase detector 28' and an indicator 32' are coupled to the output of the preamplifier circuit 31. The driving signal at the oscillator frequency for the phase detector 28' is obtained from the terminal 26 of the transformer 18, while the driving signal for the phase detector 28 is obtained from the terminal 23 of the transformer 18. With this arrangement, the signal appearing at the output of the preamplifier circuit 31 is always in-phase with one of the driving signals for the phase detectors 28 and 28'. As explained in connection with the detailed description of FIG. 8, the indicators 32 and 32' will indicate whether the detector 28 or 28', respectively, is receiving an in-phase or out-of-phase signal.

The cable 10 may be a stranded unit with no covering thereon or a plurality of stranded units cabled and bound together, or either one of the foregoing covered with an extruded plastic jacket. Moreover, the cable 10 may be provided with a metallic sheath and an outer insulating jacket. Since the capacitances of all of the conductors have been referenced to ground, a metallic sheath on the cable 10 may also be referenced to ground and the indication of the open will still be capable of being detected.

It is believed that the above described method and apparatus will be apparent from the foregoing description. While the method and apparatus of the invention have been described as being suitable for locating open sections in insulated elongated conductors in pairs or bound into a cable form with other conductor pairs and a specific embodiment has been described, it will be obvious that various changes and modifications may be made therein without departing from the spirt and scope of the invention.

What is claimed is:

1. A method of locating an open section of an insulated elongated conductor which comprises the steps of:
   simultaneously applying first and second periodic phase-shifted electrical signals to the elongated conductor on opposite sides of the open section thereof; and
   detecting a phase shift along the elongated conductor to locate the open section thereof.

2. A method of locating an open section of one of a plurality of insulated elongated conductors bound together in cable form which comprises the steps of:
   simultaneously applying first and second periodic phase-shifted signals to the open conductor on opposite sides of the open section thereof;
   adjusting the relative amplitudes of the first and second signals until the potential induced by the applied signals in the remaining conductors as a unit is a minimum; and
   detecting a phase shift along the conductors to locate the open section of the conductor having the signals applied thereto.

3. A method of locating an open section of one of a plurality of insulated elongated conductors, as set forth in claim 2, wherein the total amplitude of the first and second phase-shifted signals is a constant and said first and second signals are shifted in phase by 180°.

4. A method of locating two spaced open sections of an insulated elongated conductor which comprises the steps of:
   simultaneously applying first and second periodic phase-shifted signals to the elongated conductor on opposite sides of the spaced open sections thereof;
   detecting the disappearance of the first signal along the conductor to locate the first open section thereof; and
   detecting the appearance of the second signal along the conductor to locate the second open section thereof.

5. An apparatus for locating an open section of an insulated elongated conductor, which comprises:
   means for applying a periodic electrical signal to the elongated conductor on one side of the open section thereof;
   means for simultaneously applying a second periodic electrical signal, shifted in phase relative to the first signal, to the elongated conductor on the other side of the open section thereof; and
   means for detecting a phase shift along the elongated conductor to locate the open section thereof.

6. An apparatus for locating an open section of an insulated elongated conductor, as set forth in claim 5, wherein said means for applying the first and second periodic electrical signals includes:
   an oscillator;
   a transformer having a primary winding and a tapped secondary winding;
   means for connecting said oscillator across said primary winding of said transformer;
   means for connecting said tap on said secondary winding of said transformer to a terminal at a predetermined potential; and
   means for connecting the opposite sides of said secondary winding of said transformer to said elongated conductor on opposite sides of the open section thereof.

7. An apparatus for locating an open section of an insulated elongated conductor, as set forth in claim 5, wherein said means for applying said first and second signals to the elongated conductor includes:
   an oscillator;
   a transformer having a primary winding and a secondary winding;
   means for connecting said oscillator across said primary winding of said transformer;
   voltage dividing means connected across said secondary winding of said transformer;
   means for connecting the opposite sides of said secondary winding of said transformer to the elongated conductor on the opposite sides of the open section thereof; and
   means referencing the opposite sides of said secondary winding of said transformer and said oscillator to a point at a common potential.

8. An apparatus for locating an open section of one of a plurality of insulated elongated conductors bound together to form an elongated cable core, which comprises;
   means for applying a first periodic electrical signal to the open conductor on one side of the open section thereof;
   means for applying a second periodic electrical signal, shifted in phase relative to said first periodic electrical signal, to the open conductor on the other side of the open section thereof;
   means for connecting opposite ends of the remaining conductors of the cable core to a point at a reference potential;
   means for adjusting the relative amplitudes of said first and second electrical signals relative to said reference potential until the potential induced by the applied signals in the remaining conductors of the core as a unit relative to said reference potential is a minimum; and
   means for detecting a phase shift along the cable core to locate the open section of the conductor having the signals applied thereto.

9. An apparatus for locating an open section of one of a plurality of insulated elongated conductors, as set forth in claim 8, wherein the relative phase shift between the applied signals is 180° and the sum of the amplitudes of said applied signals is a constant.

10. An apparatus for locating an open section of one of a plurality of insulated elongated conductors, as set forth in claim 9, wherein said means for applying said first and second periodic signals to the elongated conductor includes:
   an oscillator;
   a transformer having a primary winding and a secondary winding;
   means connecting said oscillator across said primary winding of said transformer;
   an adjustable voltage dividing means connected across said secondary winding of said transformer;
   means for referencing said oscillator and said voltage dividing means to said reference potential; and
   means for connecting the opposite sides of said secondary winding of said transformer to the elongated conductor on opposite sides of the open section thereof.

11. An apparatus for locating an open section of one of a plurality of insulated elongated conductors, as set forth in claim 10, wherein said reference potential is zero and said adjustable voltage dividing means is a potentiometer including a resistance connected across said secondary winding of said transformer and a moveable contactor connected to ground.

12. An apparatus for locating an open section of one of a plurality of insulated elongated conductors, as set forth in claim 8 wherein said detecting means includes:
   an electrode having a passageway therethrough for receiving successively presented sections of the cable core;
   a phase detector having a signal input for receiving a signal and an output operable when the signal at said input has shifted in phase;
   means for coupling said electrode to said signal input of said phase detector; and
   indicator means coupled to the output of said phase detector for indicating a shift in phase of the signal coupled to the input of said phase detector.

13. An apparatus for locating an open section of one of a plurality of insulated elongated conductors, as set forth in claim 12, wherein said phase detector is synchronized with one of the signals applied to the open conductor.

14. An apparatus for locating an open section in one of a plurality of insulated elongated conductors, as set forth in claim 13, wherein said phase detector includes:
   switching means for separating the positive and negative half cycles of a periodic signal coupled to the input of said phase detector;
   means for inverting the separated signals representing successive negative half cycles of said signal;
   means for summing the separated and inverted signals;
   means for sampling the positive half cycles of the synchronizing signal applied to one side of the open conductor;
   gating means;
   means simultaneously applying said summed signals and said sampled signals to said gating means; and
   means driven by said gating means to produce a polarized output having a first polarity when the periodic signal is in phase with the synchronizing signal and an opposite polarity when said periodic signal is out of phase with the synchronizing signal.

15. An apparatus for locating an open section of one of a plurality of insulated elongated conductors, as set forth in claim 12 and including:
   a second phase detector having a signal input for receiving a signal and an output operable when the signal received at said input has shifted in phase;
   means for coupling said electrode to said signal input of said second phase detector;
   second indicator means coupled to the output of said second phase detector for indicating a shift in phase of the signal received at the input of said second phase detector; and
   means synchronizing said second phase detector with the other of the periodic signals applied to said open conductor.

* * * * *